(12) United States Patent
Zemitis et al.

(10) Patent No.: US 10,683,765 B2
(45) Date of Patent: Jun. 16, 2020

(54) TURBINE BLADES HAVING SHANK FEATURES AND METHODS OF FABRICATING THE SAME

(71) Applicant: General Electric Company, Schenectady, NY (US)

(72) Inventors: William Scott Zemitis, Simpsonville, SC (US); Richard Ryan Pilson, Greer, SC (US); Felipe Roman-Morales, Simpsonville, SC (US); Melbourne James Myers, Woodruff, SC (US); Kevin Lee Worley, Taylors, SC (US)

(73) Assignee: General Electric Company, Schenectady, NY (US)

( * ) Notice: Subject to any disclaimer, the term of this patent is extended or adjusted under 35 U.S.C. 154(b) by 504 days.

(21) Appl. No.: 15/431,994

(22) Filed: Feb. 14, 2017

(65) Prior Publication Data
US 2018/0230829 A1  Aug. 16, 2018

(51) Int. Cl.
| *F01D 5/08* | (2006.01) |
| *F01D 5/30* | (2006.01) |
| *F01D 5/14* | (2006.01) |

(52) U.S. Cl.
CPC ............ *F01D 5/3015* (2013.01); *F01D 5/081* (2013.01); *F01D 5/147* (2013.01); *F05D 2230/10* (2013.01); *F05D 2250/74* (2013.01)

(58) Field of Classification Search
CPC ........ F01D 5/3015; F01D 5/081; F01D 5/147; F01D 5/005; F05D 2230/10; F05D 2250/74
See application file for complete search history.

(56) References Cited

U.S. PATENT DOCUMENTS

| 3,137,478 | A |   | 6/1964  | Farrell |   |
| 3,986,793 | A | * | 10/1976 | Warner | B23P 6/002 |
|           |   |   |         |        | 416/212 A |
| 4,120,607 | A | * | 10/1978 | Coplin | F01D 21/045 |
|           |   |   |         |        | 416/193 A |
| 4,872,812 | A | * | 10/1989 | Hendley | F01D 5/22 |
|           |   |   |         |        | 416/190 |
| 5,435,694 | A | * | 7/1995  | Kray | F01D 5/141 |
|           |   |   |         |        | 416/219 R |
| 5,980,209 | A |   | 11/1999 | Barry et al. |   |
| 6,033,185 | A | * | 3/2000  | Lammas | F01D 5/3038 |
|           |   |   |         |        | 416/193 A |
| 6,390,775 | B1 |  | 5/2002  | Paz |   |
| 6,419,447 | B1 | * | 7/2002 | Watanabe | F01D 5/147 |
|           |   |   |         |        | 415/115 |
| 6,506,016 | B1 | * | 1/2003 | Wang | F01D 5/147 |
|           |   |   |         |        | 415/173.7 |
| 6,851,932 | B2 | * | 2/2005 | Lagrange | F01D 5/22 |
|           |   |   |         |        | 416/190 |

(Continued)

*Primary Examiner* — Moshe Wilensky
*Assistant Examiner* — Theodore C Ribadeneyra
(74) *Attorney, Agent, or Firm* — Armstrong Teasdale LLP

(57) ABSTRACT

A method of modifying a shank of a turbine blade from an initial profile to an undercut profile includes removing a first portion of material from an underside of a downstream angel wing of the turbine blade. The downstream angel wing extends axially from a downstream cover plate of the shank. The method also includes removing a second portion of material from a generally axially-extending portion of the downstream cover plate adjacent a dovetail of the turbine blade.

20 Claims, 8 Drawing Sheets

(56) References Cited

U.S. PATENT DOCUMENTS

| | | | |
|---|---|---|---|
| 7,121,803 B2 | 10/2006 | Gautreau et al. | |
| 7,594,799 B2 | 9/2009 | Miller et al. | |
| 7,762,779 B2 | 7/2010 | Zemitis et al. | |
| 8,727,730 B2 | 5/2014 | Liotta et al. | |
| 8,967,974 B2 | 3/2015 | Garcia-Crespo | |
| 9,359,905 B2* | 6/2016 | Lamicq | F01D 5/3007 |
| 9,841,031 B2* | 12/2017 | Clarke | F01D 5/3007 |
| 9,951,638 B2* | 4/2018 | Grover | F01D 11/001 |
| 10,190,595 B2* | 1/2019 | Li | F01D 5/14 |
| 10,221,709 B2* | 3/2019 | Brandl | F01D 25/12 |
| 10,287,898 B2* | 5/2019 | Bluck | F01D 5/3007 |
| 2005/0008491 A1* | 1/2005 | Follonier | F01D 5/3038 416/219 R |
| 2011/0158811 A1* | 6/2011 | Morrison | F01D 5/147 416/204 R |
| 2012/0051930 A1 | 3/2012 | Paney et al. | |
| 2013/0115096 A1* | 5/2013 | Itzel | F01D 5/288 416/241 B |
| 2013/0259700 A1* | 10/2013 | Piersall | F01D 5/3015 416/229 R |
| 2013/0336801 A1* | 12/2013 | Giri | F01D 5/143 416/243 |
| 2014/0294587 A1* | 10/2014 | Dupeyre | F01D 5/30 416/193 A |
| 2014/0363279 A1* | 12/2014 | Wondrasek | F01D 11/006 415/173.1 |
| 2015/0010393 A1 | 1/2015 | Hafner | |
| 2015/0056073 A1* | 2/2015 | Fedor | F01D 5/081 416/1 |
| 2015/0064008 A1* | 3/2015 | Lewis | F01D 11/02 416/174 |
| 2016/0215625 A1* | 7/2016 | Chouhan | F01D 5/147 |
| 2016/0215626 A1* | 7/2016 | Chouhan | F01D 11/006 |
| 2017/0198585 A1* | 7/2017 | Ratzlaff | F01D 5/081 |
| 2018/0223683 A1* | 8/2018 | Tham | F01D 11/001 |
| 2018/0230820 A1 | 8/2018 | Zemitis et al. | |
| 2018/0230829 A1 | 8/2018 | Zemitis et al. | |

* cited by examiner

TURBINE BLADES HAVING SHANK FEATURES AND METHODS OF FABRICATING THE SAME

BACKGROUND

The field of the disclosure relates generally to rotary machines, and more particularly, to a blade that includes shank features that facilitate reducing stress peaks and gradients within the shank.

At least some known rotary machines include a compressor, a combustor coupled downstream from the compressor, a turbine coupled downstream from the combustor, and a rotor shaft rotatably coupled between the compressor and the turbine. Some known turbines include at least one rotor disk coupled to the rotor shaft, and a plurality of circumferentially-spaced turbine blades that extend outward from each rotor disk to define a stage of the turbine. Each turbine blade includes an airfoil that extends radially outward from a platform towards a turbine casing.

At least some known turbine blades include a shank and dovetail radially inward of the platform to facilitate coupling the blade to the rotor disk. An operational life cycle of at least some turbine blades is limited at least in part by fatigue induced as a result of a mean stress field and a vibratory stress field converging to form a stress concentration in an interface defined between the blade dovetail and the blade shank.

To facilitate reducing stress concentrations, at least some known turbine blades include dovetail backcuts designed to relieve stresses in the shank-to-dovetail interface. However, because of increased complexity and an associated expense of manufacture of the turbine blade, based on a location and amount of material that must be removed, an effectiveness of using dovetail backcuts may be limited. Additionally or alternatively, at least some known dovetail backcuts require complementary modifications to the rotor disk as well, which also increases the cost of manufacturing.

BRIEF DESCRIPTION

In one aspect, a method of modifying a shank of a turbine blade from an initial profile to an undercut profile is provided. The method includes removing a first portion of material from an underside of a downstream angel wing of the turbine blade. The downstream angel wing extends axially from a downstream cover plate of the shank. The method also includes removing a second portion of material from a generally axially-extending portion of the downstream cover plate adjacent a dovetail of the turbine blade.

In another aspect, a method of modifying a shank of a turbine blade from an initial profile to an undercut profile is provided. The method includes removing a first portion of material from an underside of a downstream angel wing of the turbine blade. The downstream angel wing extends axially from a downstream cover plate of the shank. The method also includes removing a third portion of material from a generally radially-extending portion of the downstream cover plate radially inward of the downstream angel wing.

In another aspect, a turbine blade is provided. The turbine blade includes an airfoil that extends radially between a root end and a tip end, and a platform coupled to the root end. The turbine blade also includes a shank that extends radially inwardly from the platform. The shank includes a downstream cover plate and a downstream angel wing that extends axially from the downstream cover plate. The turbine blade further includes a dovetail that extends radially inwardly from the shank. A profile of an underside of the downstream angel wing and a portion of the downstream cover plate radially inward of the downstream angel wing is defined by a plurality of points having coordinates listed in Table 1 subject to a tolerance of about ±0.030 inches. The plurality of points is joined with smooth continuous arcs. Each of the coordinates for the T datum in Table 1 is adjusted based on a difference between a datum distance W2 of the turbine blade and a reference datum distance W2 associated with Table 1.

DETAILED DESCRIPTION

The embodiments described herein include a turbine blade shank in which portion of a downstream angel wing, and a portion of a downstream cover plate radially inward of that angel wing, cooperate to facilitate reducing a mean stress concentration and a vibratory stress concentration induced to an intersection of the downstream cover plate, a pressure side face, and a dovetail of the blade. In some embodiments the shank of an existing turbine blade may be modified by removing at least one of a first portion of material from an underside of the downstream angel wing, a second portion of material from a generally axially-extending portion of the downstream cover plate adjacent the dovetail, and a third portion of material from a generally radially-extending portion of the downstream cover plate radially inward of the downstream angel wing. In at least some embodiments, the stress reduction benefits are achieved without modifying the dovetail, such that no corresponding modifications to the rotor disk are required to accommodate the modified blade.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "upstream" refers to a forward or inlet end of a gas turbine engine, and the term "downstream" refers to a downstream or nozzle end of the gas turbine engine.

Figure 1:
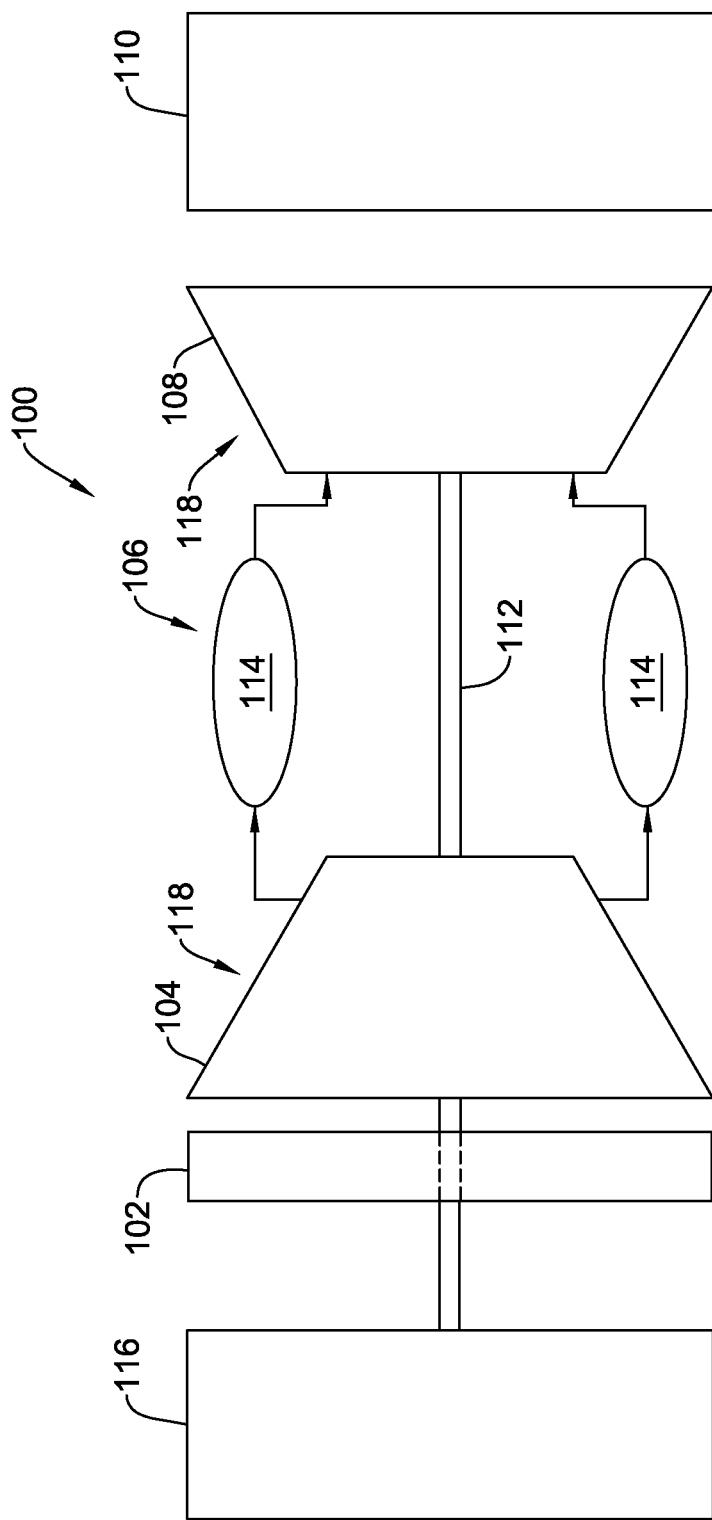
FIG. 1 is a schematic view of an exemplary rotary machine.

FIG. 1 is a schematic view of an exemplary rotary machine 100. In the exemplary embodiment, rotary machine 100 is a gas turbine engine. Alternatively, rotary machine 100 is any other turbine engine and/or rotary machine, including, without limitation, a steam turbine engine, a gas turbofan aircraft engine, other aircraft engine, a wind turbine, a compressor, and/or a pump. In the exemplary embodiment, gas turbine 100 includes an intake section 102, a compressor section 104 that is coupled downstream from intake section 102, a combustor section 106 that is coupled downstream from compressor section 104, a turbine section 108 that is coupled downstream from combustor section 106, and an exhaust section 110 that is coupled downstream from turbine section 108. Turbine section 108 is coupled to compressor section 104 via a rotor shaft 112. In the exemplary embodiment, combustor section 106 includes a plurality of combustors 114. Combustor section 106 is coupled to compressor section 104 such that each combustor 114 is in flow communication with the compressor section 104. Turbine section 108 is further coupled to a load 116 such as, but not limited to, an electrical generator and/or a mechanical drive application. In the exemplary embodiment, each compressor section 104 and turbine section 108 includes at least one rotor assembly 118 that is coupled to rotor shaft 112.

Figure 2:
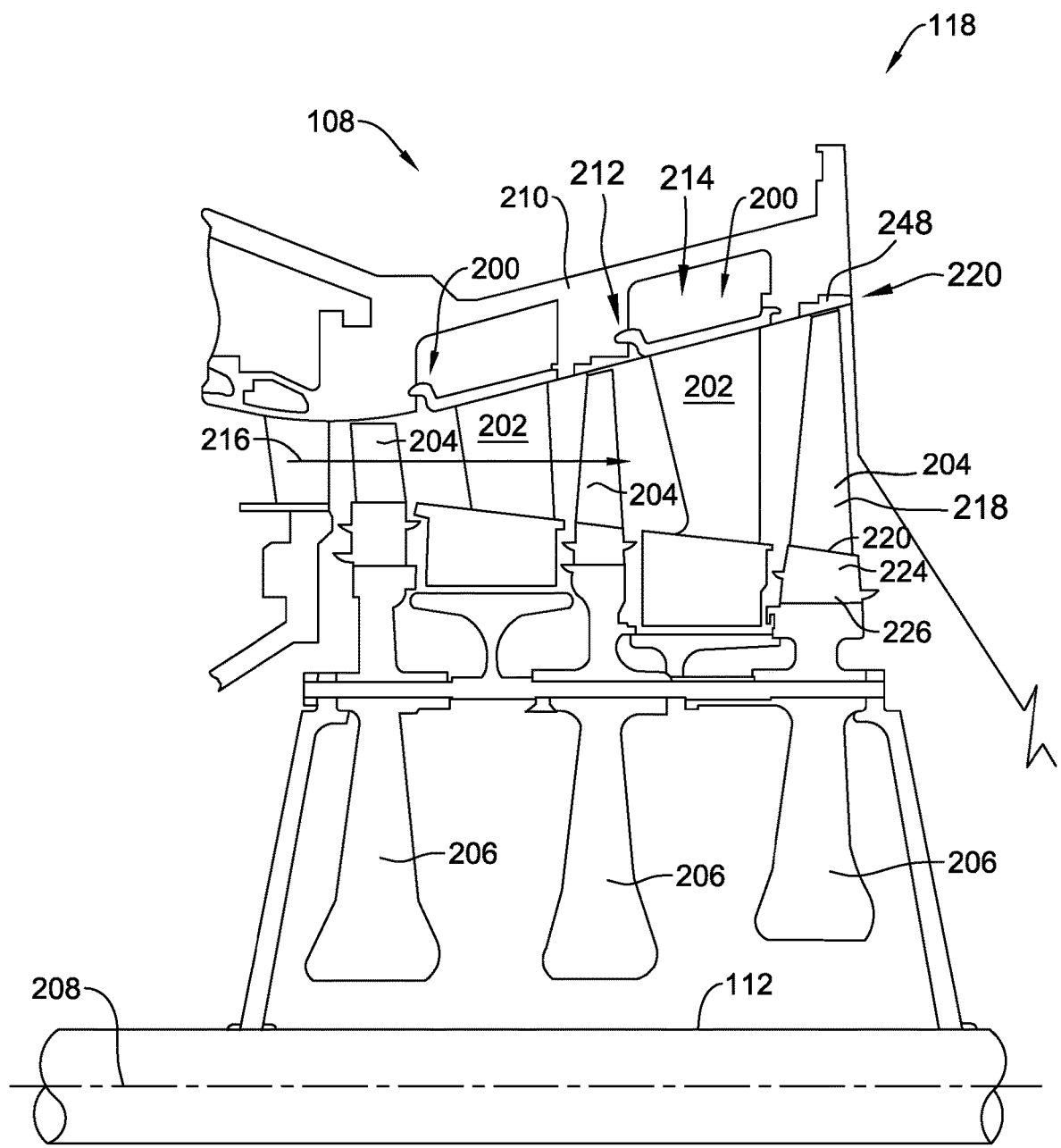
FIG. 2 is a partial sectional view of a portion of an exemplary rotor assembly that may be used with the rotary machine shown in FIG. 1.

FIG. 2 is a partial sectional view of a portion of an exemplary rotor assembly 118. In the exemplary embodiment, turbine section 108 includes a plurality of stages 200 that each include a stationary row 212 of stator vanes 202 and a row 214 of rotating turbine blades 204. Turbine blades 204 in each row 214 are spaced circumferentially about, and extend radially outward from, a rotor disk 206. Each rotor disk 206 is coupled to rotor shaft 112 and rotates about a centerline axis 208 that is defined by rotor shaft 112. A turbine casing 210 extends circumferentially about rotor assembly 118 and stator vanes 202. Stator vanes 202 are each coupled to turbine casing 210 and each extends radially inward from casing 210 towards rotor shaft 112. A combustion gas path 216 is defined between turbine casing 210 and each rotor disk 206. Each row 212 and 214 of turbine blades 204 and stator vanes 202 extends at least partially through a portion of combustion gas path 216.

With reference to FIGS. 1 and 2, during operation, intake section 102 channels air towards compressor section 104. Compressor section 104 compresses air and discharges compressed air into combustor section 106 and towards turbine section 108. The majority of air discharged from compressor section 104 is channeled towards combustor section 106. More specifically, pressurized compressed air is channeled to combustors 114 wherein the air is mixed with fuel and ignited to generate high temperature combustion gases. The combustion gases are channeled towards combustion gas path 216, wherein the gases impinge upon turbine blades 204 and stator vanes 202 to facilitate imparting a rotational force on rotor assembly 118.

Figure 3:
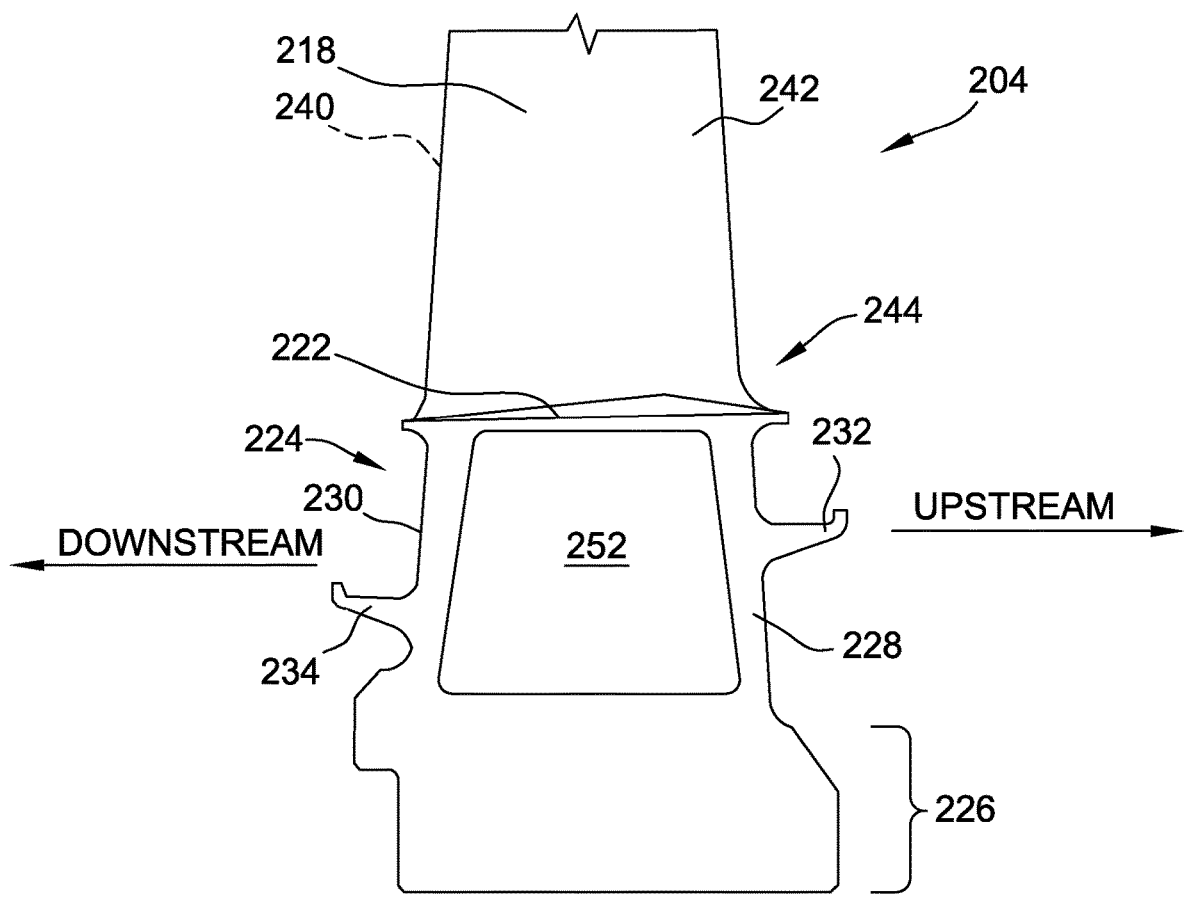
FIG. 3 is a perspective view of a pressure side of an exemplary turbine blade that may be used with the rotor assembly shown in FIG. 2.
Figure 4:
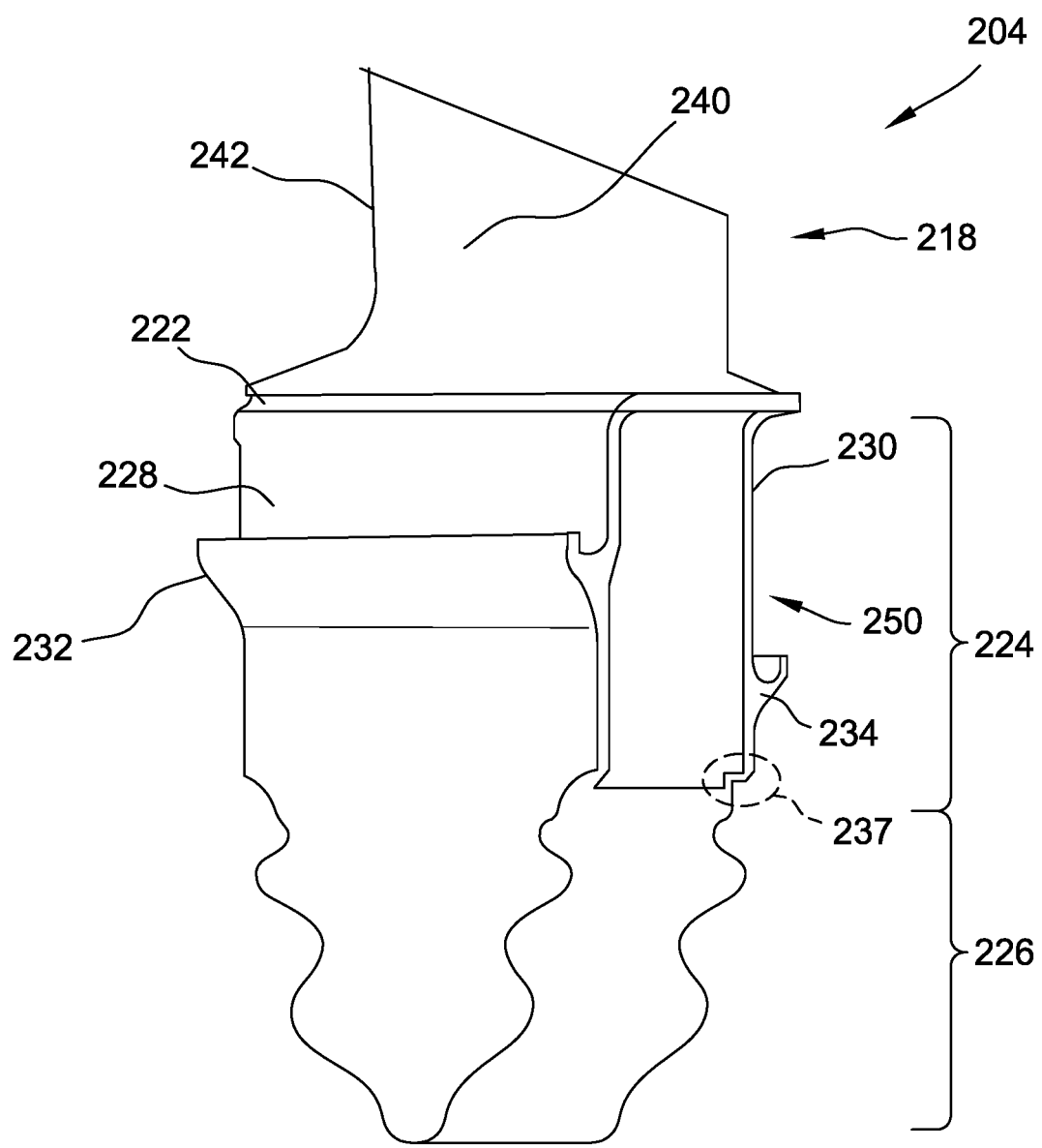
FIG. 4 is a perspective view of an exemplary turbine blade shank, dovetail, and platform that may be used with the turbine blade shown in FIG. 3.

FIG. 3 is a perspective view of a pressure side of an exemplary turbine blade 204. FIG. 4 is a perspective view of an exemplary shank 224, a dovetail region 226, and platform 222 for use with exemplary blade 204. With reference to FIGS. 2-4, in the exemplary embodiment, each turbine blade 204 includes an airfoil 218 that extends radially between a root end 244 and a tip end 220 and that defines a pressure side 240 and an opposite suction side 242. Further in the exemplary embodiment, each turbine blade 204 includes a tip shroud 248 extending from tip end 220 of airfoil 218, a platform 222 coupled to root end 244, a shank 224 that extends radially inwardly from platform 222, and dovetail region 226 that extends radially inwardly from shank 224 and that is shaped to facilitate secure coupling of blade 204 to rotor disk 206. More specifically, in the exemplary embodiment, dovetail 226 is characterized by a wavy outer surface that is shaped to be received within a complementarily shaped slot (not shown) defined in rotor disk 206. In alternative embodiments, dovetail 226 has any other suitable shape that enables blade 204 to function as described herein. Platform 222 at least partially defines a radially inner boundary of hot gas path 216. In alternative embodiments, each blade 204 includes any suitable structure that enables blade 204 to function as described herein.

In the exemplary embodiment, shank 224 includes an upstream cover plate 228 and a downstream cover plate 230. Upstream cover plate 228 and downstream cover plate 230 each extend radially between dovetail 226 and platform 222, and laterally from a pressure side face 250 to an opposite suction side face 252 of shank 224. An upstream angel wing 232 extends axially upstream, relative to hot gas path 216, from upstream cover plate 228, and extends laterally along a face of upstream cover plate 228. A downstream angel wing 234 extends axially downstream from downstream cover plate 230, and extends laterally along a face of downstream cover plate 230. In alternative embodiments, blade 204 includes any suitable number of each of upstream angel wings 232 and downstream angel wings 234, including zero, that enables blade 204 to function as described herein.

A region 237 of blade 204 encompasses, and is defined generally proximate, an intersection of cover plate 230, pressure side face 250, and dovetail 226. In some embodiments, when blade 204 is in operation in gas turbine 100, a mean stress concentration and a vibratory stress concentration of blade 204 both may occur proximate region 237.

Figure 5:
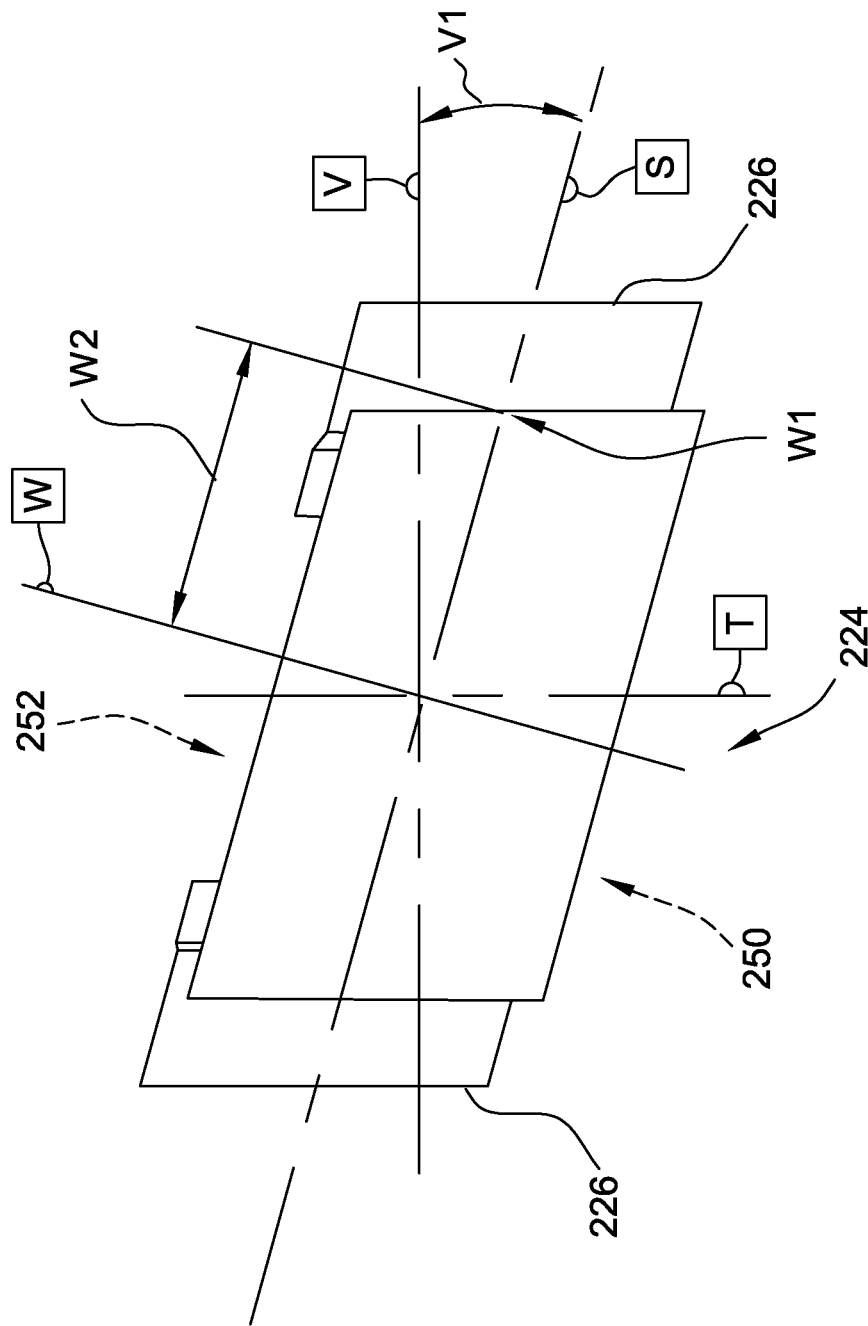
FIG. 5 is sectional view of a shank of the exemplary turbine blade shown in FIG. 3, illustrating a plurality of datums S, T, V, and W defined with respect to the exemplary turbine blade shown in FIG. 3.
Figure 6:
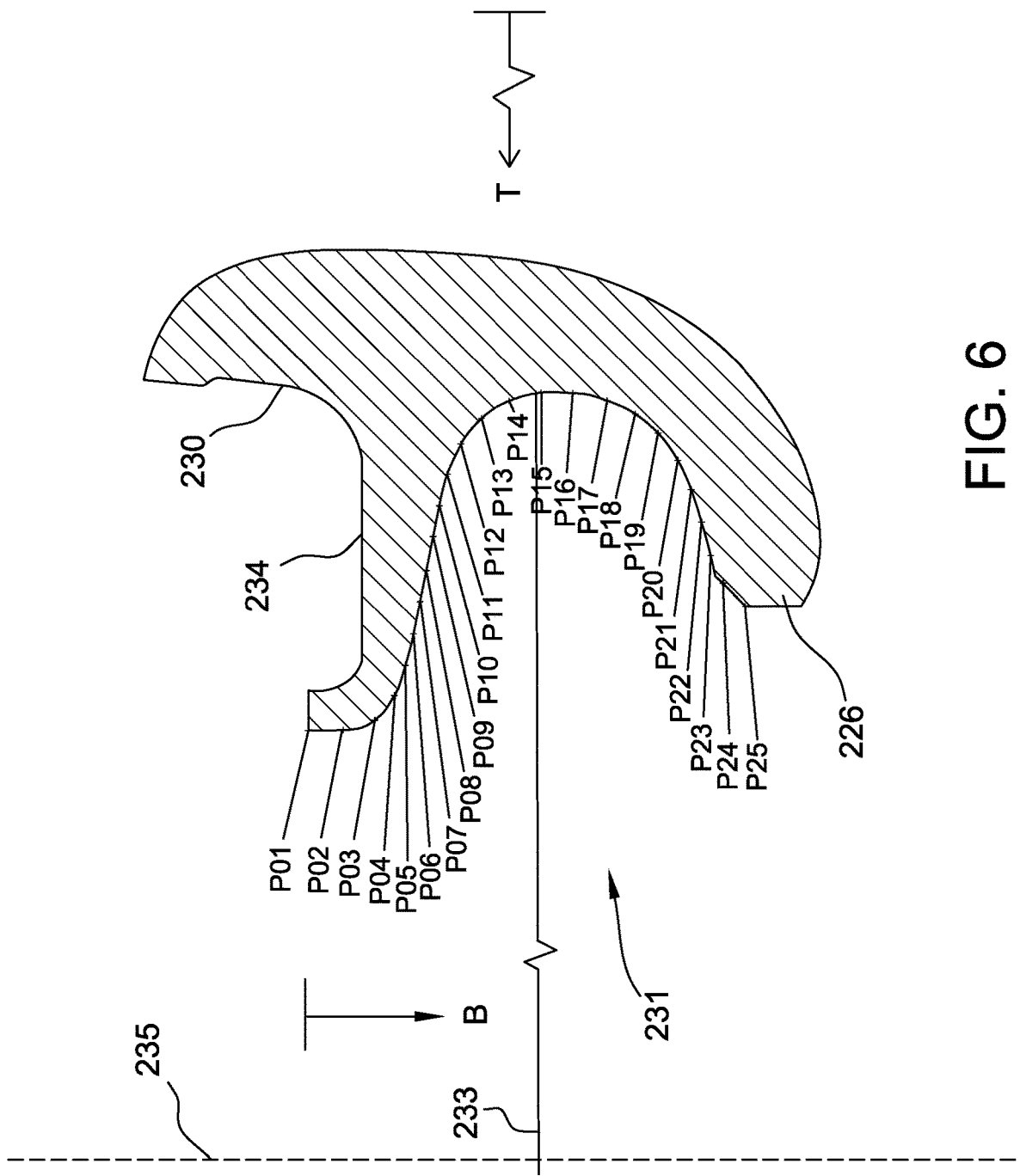
FIG. 6 is a sectional view illustrating an exemplary profile of an underside of a downstream angel wing and a portion of a downstream cover plate of the turbine blade shown in FIG. 3.

FIG. 5 is a sectional view of shank 224 of turbine blade 204 illustrating a plurality of datums S, T, V, and W defined with respect to blade 204. FIG. 6 is a sectional view illustrating a profile 231 of an underside of downstream angel wing 234 and a portion of downstream cover plate 230 radially inward of downstream angel wing 234, illustrating a datum B defined with respect to blade 204. The plurality of datums B, S, T, V, and W may be used to establish a location of any point on blade 204, as will be described herein. In the exemplary embodiment, primary datum S is a radially extending plane defined with respect to at least one physical feature of blade 204 such that datum S bisects shank 224. Secondary datum B is a plane defined perpendicular to a radially extending line through airfoil 218, and hence perpendicular to datum S, at a radial location established by a top point of downstream angel wing 234. Tertiary datum W also is a radially extending plane defined perpendicular to each of datum S and datum B, and intersects datum S at a distance W2 from datum target point W1, taken parallel to datum B along datum S as shown in FIG. 5. Finally, a pair of radially extending, orthogonal datums T and V are respective planes rotated at angle V1 in a counterclockwise direction with respect to the view of FIG. 5, from orthogonal datums S and W, about the line of intersection of datums S and W. Datums B, T, and V will be used herein to provide identifiable reference points for a surface of turbine blade 204.

More specifically, profile 231 is defined by a plurality of points identified as P01, P02, . . . , P25 and joined with smooth continuous arcs. Table 1 below is an exemplary table of coordinates, relative to datums B, T, and V described above, for plurality of points P01, P02, . . . , P25 for an exemplary embodiment of profile 231. More specifically, with reference to FIGS. 4-6, the values in Table 1 are generated and shown to three decimal places, in inches, based on an exemplary reference distance W2 of 2.529 inches, and an exemplary reference angle V1 of 15.5°.

TABLE 1

|     | B     | T     | V     |
| --- | ----- | ----- | ----- |
| P01 | 0.000 | 3.456 | 0.794 |
| P02 | 0.108 | 3.456 | 0.792 |
| P03 | 0.210 | 3.427 | 0.790 |
| P04 | 0.277 | 3.343 | 0.788 |
| P05 | 0.318 | 3.243 | 0.787 |
| P06 | 0.342 | 3.138 | 0.787 |
| P07 | 0.363 | 3.031 | 0.787 |
| P08 | 0.384 | 2.925 | 0.786 |
| P09 | 0.405 | 2.819 | 0.786 |
| P10 | 0.426 | 2.713 | 0.785 |
| P11 | 0.454 | 2.608 | 0.785 |
| P12 | 0.498 | 2.510 | 0.784 |
| P13 | 0.566 | 2.426 | 0.782 |
| P14 | 0.657 | 2.368 | 0.780 |
| P15 | 0.761 | 2.341 | 0.778 |
| P16 | 0.869 | 2.341 | 0.776 |
| P17 | 0.974 | 2.367 | 0.774 |
| P18 | 1.073 | 2.410 | 0.772 |
| P19 | 1.157 | 2.477 | 0.770 |
| P20 | 1.216 | 2.568 | 0.769 |
| P21 | 1.258 | 2.668 | 0.768 |
| P22 | 1.290 | 2.771 | 0.767 |
| P23 | 1.317 | 2.876 | 0.767 |
| P24 | 1.361 | 2.971 | 0.766 |
| P25 | 1.439 | 3.046 | 0.764 |

In certain embodiments, a shape of an underside of downstream angel wing 234 and a portion of downstream cover plate 230 radially inward from downstream angel wing 234 is defined by a cylindrical rotation, about a radially-extending axis 235 using a cylinder radius 233 that is substantially parallel to the B datum plane, of profile 231, and between pressure side face 250 and opposite suction side face 252 of shank 224. In some such embodiments, it has been determined that shaping the underside of downstream angel wing 234 and the portion of downstream cover plate 230 radially inward of downstream angel wing 234, according to the cylindrical rotation of profile 231 shifts a mean stress concentration and a vibratory stress concentration away from each other proximate region 237 (shown in FIG. 4), as compared to at least some known blades, thereby facilitating a reduced fatigue of blade 204 and improving an operational life cycle of blade 204, while maintaining an acceptable structural performance of blade 204.

Alternatively, in some embodiments, the shape of the underside of downstream angel wing 234 and the portion of downstream cover plate 230 radially inward from downstream angel wing 234 is defined by a straight translation, along an axis extending substantially perpendicularly to the V datum plane, of profile 231 between pressure side face 250 and opposite suction side face 252 of shank 224. In some such embodiments, it has been determined that shaping the underside of downstream angel wing 234 and the portion of downstream cover plate 230 radially inward from downstream angel wing 234 according to the straight translation of profile 231 also shifts the mean stress concentration and the vibratory stress concentration away from each other proximate region 237 (shown in FIG. 4), as compared to at least some known blades. As such, fatigue of blade 204 is facilitated to be reduced and an operational life cycle of blade 204 is improved, while an acceptable structural performance of blade 204 is maintained. In some embodiments, the relative displacement of the mean stress concentration and the vibratory stress concentration is not as great within the straight translation of profile 231 as within the cylindrical rotation described above, but nevertheless produces a significant advantage over known blades. Moreover, in some such embodiments, a straight translation of profile 231 facilitates reducing a manufacturing complexity of blade 204 as compared to cylindrical rotation of profile 231.

In addition, at least some embodiments include variations in the datum values set forth in Table 1 while preserving the advantages described above to a substantial degree. For example, in some embodiments, either manufacturing tolerances and/or protective coatings can cause each datum value listed in Table 1 to vary within a tolerance of about ±0.030 inches, while preserving the advantages described above to a substantial degree. Accordingly, the values for profile 231 given in Table 1 are for a nominal profile 231, and are subject to a tolerance. It will therefore be appreciated that typical tolerances, i.e., ±values, including any coating thicknesses, are additive to the distance from a given datum given in Table 1.

Moreover, the nominal datum values in Table 1 are applicable as described above to a range of values of angle V1. More specifically, the nominal datum values in Table 1 are applicable as described above to values of angle V1 that are within a range of about ±10 percent from the exemplary value of angle V1 associated with Table 1.

In addition, the nominal datum values in Table 1 are scalable to a range of values of distance W2. More specifically, in embodiments in which datum distance W2 of blade 204 differs from the reference datum distance W2 associated with Table 1, but remains in a range of between about 2.00 inches and about 3.00 inches, each of the values for the T datum in Table 1 can be adjusted by an amount equal to the difference between datum distance W2 and reference datum distance W2, multiplied by the cosine of angle V1 of blade 204, such that the advantages described above are substantially preserved. As an illustrative example, in one embodiment, W2 for an alternative blade 204 is 2.400 inches and angle V1 remains 15.5°, and each of the values for the T datum in Table 1 are adjusted by an amount equal to the difference between datum distance W2 and reference datum distance W2, multiplied by the cosine of angle V1, that is, by $(2.400-2.529)*\cos(15.5°)=-0.124$ inches.

Figure 7:
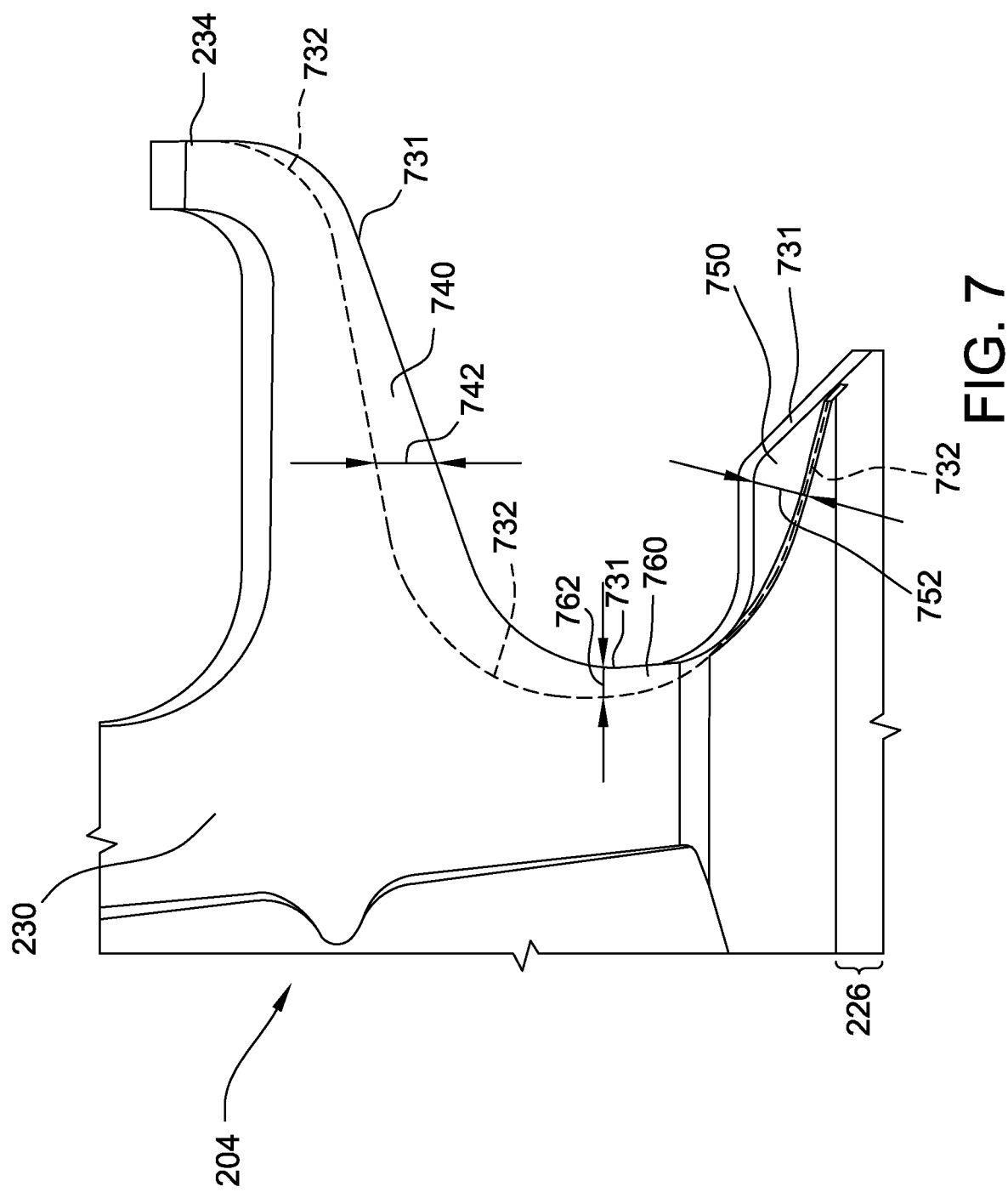
FIG. 7 is a schematic perspective view of another exemplary profile of a shank of the turbine blade shown in FIG. 3.
Figure 8:
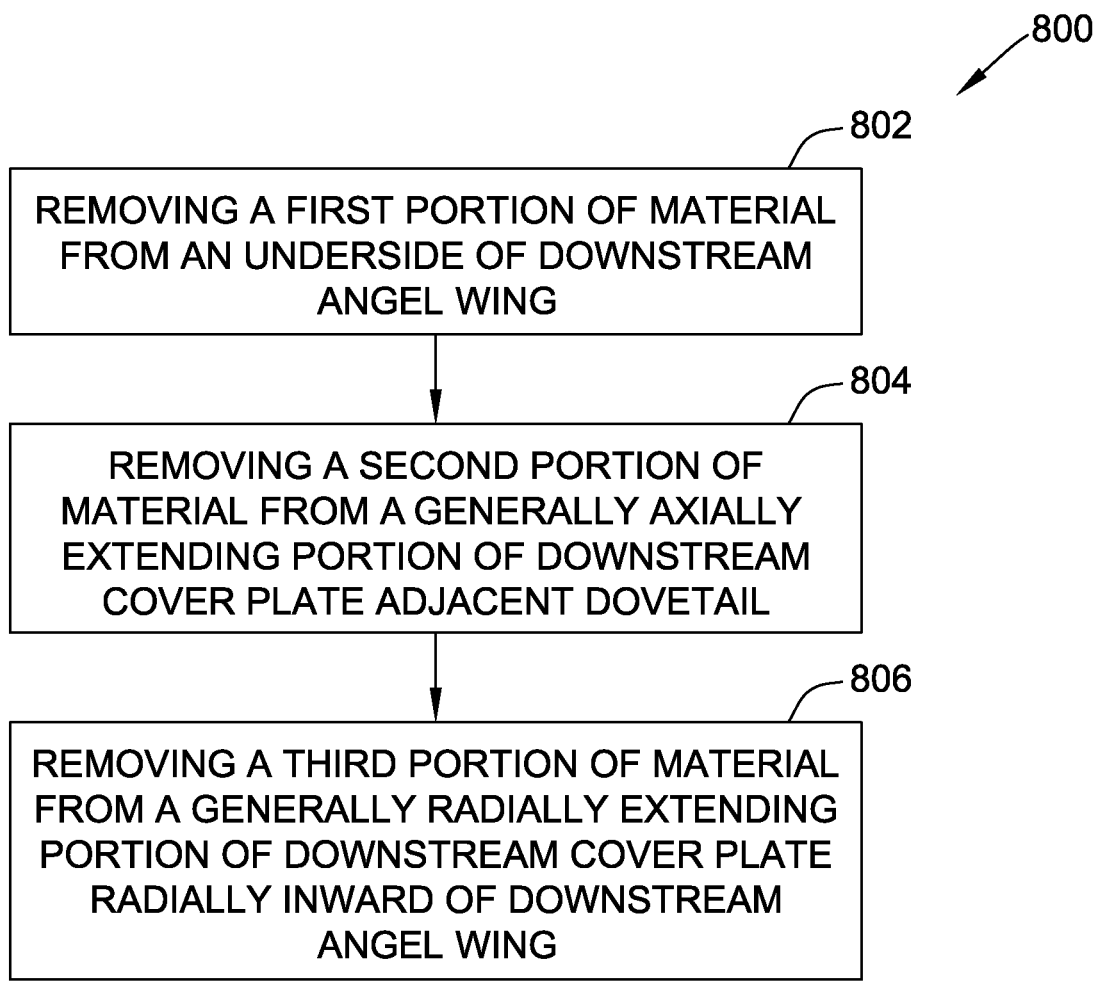
FIG. 8 is a flow diagram illustrating an exemplary method of modifying the shank of a turbine blade, such as the exemplary turbine blade shown in FIG. 3.

FIG. 7 is a schematic perspective view of another exemplary turbine blade 204, illustrating an exemplary method 800 of modifying shank 224 of turbine blade 206 from an initial profile 731 (illustrated as a solid line) to an undercut profile 732 (illustrated as a dashed line). FIG. 8 is a flow diagram of method 800. More specifically, in the exemplary embodiment, a portion of downstream cover plate 230, including downstream angel wing 234, of a blade 204 having initial profile 731 is modified, such as, but not limited to, via a machining process, to replace initial profile 731 with undercut profile 732.

In some embodiments, method 800 includes removing 802 a first portion 740 of material from an underside of downstream angel wing 234. For example, in some embodiments, a maximum thickness 742 in a range of between about 0.070 inches to about 0.150 inches is removed from the underside of downstream angel wing 234. In another example, in the exemplary embodiment, a material having a maximum thickness 742 of about 0.100 inches is removed from the underside of downstream angel wing 234. In some such embodiments, it has been determined that removing first portion 740 of material from the underside of downstream angel wing 234 shifts the mean stress concentration and the vibratory stress concentration away from each other proximate region 237 (shown in FIG. 4), as compared to a blade 204 having an initial profile 731, thereby facilitating a reduced fatigue of blade 204 and improving an operational life cycle of blade 204, while maintaining an acceptable structural performance of blade 204.

Additionally or alternatively, in some embodiments, method 800 includes removing 804 a second portion 750 of material from a generally axially-extending portion of downstream cover plate 230 adjacent dovetail 226. For example, in some embodiments, material having a maximum thickness 752 in a range of about 0.020 inches to about 0.040 inches is removed from the generally axially extending portion of downstream cover plate 230 adjacent dovetail 226. In another example, in the exemplary embodiment, material having a maximum thickness 752 of between about 0.030 inches is removed from the generally axially-extending portion of downstream cover plate 230 adjacent dovetail 226. In some such embodiments, it has been determined that removing second portion 750 of material from the generally axially-extending portion of downstream cover plate 230 adjacent dovetail 226 shifts the mean stress concentration and the vibratory stress concentration away from each other proximate region 237 (shown in FIG. 4), as compared to a blade 204 having an initial profile 731, thereby facilitating a reduced fatigue of blade 204 and improving an operational life cycle of blade 204, while maintaining an acceptable structural performance of blade 204.

Additionally or alternatively, in some embodiments, method 800 includes removing 806 a third portion 760 of material from a generally radially-extending portion of downstream cover plate 230 radially inward of downstream angel wing 234. For example, in some embodiments, material having a maximum thickness 762 in a range of about 0.050 inches to about 0.070 inches is removed from the generally radially-extending portion of downstream cover plate 230 radially inward of downstream angel wing 234. In another example, in the exemplary embodiment, material having a maximum thickness 752 of about 0.060 inches is removed from the generally radially-extending portion of downstream cover plate 230 radially inward of downstream angel wing 234. In some such embodiments, it has been determined that removing third portion 760 of material from the generally radially-extending portion of downstream cover plate 230 radially inward of downstream angel wing 234 shifts the mean stress concentration and the vibratory stress concentration away from each other proximate region 237 (shown in FIG. 4), as compared to a blade 204 an having initial profile 731, thereby facilitating a reduced fatigue of blade 204 and improving an operational life cycle of blade 204, while maintaining an acceptable structural performance of blade 204.

In addition, in at least some embodiments, removal of at least two of first portion 740, second portion 750, and third portion 760 produces enhanced relative displacement of the mean stress concentration and the vibratory stress concentration proximate region 237 (shown in FIG. 4), as compared to removing solely one of first portion 740, second portion 750, and third portion 760. Moreover, in at least some embodiments, removal of all of first portion 740, second portion 750, and third portion 760 produces enhanced relative displacement of the mean stress concentration and the vibratory stress concentration proximate region 237, as compared to removing just one or two of first portion 740, second portion 750, and third portion 760. Nevertheless, substantial benefits are still obtainable by removing solely one or two of first portion 740, second portion 750, and third portion 760. Moreover, in all such embodiments, relative displacement of the mean stress concentration and the vibratory stress concentration proximate region 237 is obtained without modification of dovetail 226, thereby facilitating an avoidance of any requirement to modify a slot (not shown) defined in rotor disk 206 to receive modified blade 204.

In some embodiments, a shape of an underside of downstream angel wing 234 and a portion of downstream cover plate 230 radially inward of downstream angel wing 234 is defined by a cylindrical rotation of undercut profile 732 between pressure side face 250 and opposite suction side face 252 of shank 224, as described above. In alternative embodiments, the shape of the underside of downstream angel wing 234 and the portion of downstream cover plate 230 radially inward of downstream angel wing 234 is defined by a straight translation of undercut profile 732 between pressure side face 250 and opposite suction side face 252 of shank 224, as described above.

Moreover, in at least some embodiments, undercut profile 732 is identical to profile 231, as discussed above, including scaling and manufacturing tolerances, with respect to FIG. 6 and Table 1. In some such embodiments, profile 732 identical to profile 231, which involves removing each of first portion 740, second portion 750, and third portion 760, results in a particularly advantageous relative displacement of the mean stress concentration and the vibratory stress concentration proximate region 237, and thus a particularly advantageous reduction of fatigue on blade 204, while maintaining an acceptable structural performance of blade 204. In alternative embodiments, substantial advantages are obtained with undercut profile 732 implemented as other than profile 231.

The above-described embodiments of turbine blades and methods of modifying a shank of a turbine blade overcome at least some disadvantages of known turbine blades. Specifically, a profile of an underside of a downstream angel wing and a portion of a downstream cover plate radially inward of the downstream angel wing facilitates separating and/or reducing a mean stress concentration and a vibratory stress concentration proximate an intersection of the downstream cover plate, a pressure side face, and a dovetail of the blade. Also specifically, in some embodiments, the shank of an existing turbine blade is modified by removing at least one of a first portion of material from an underside of the downstream angel wing, a second portion of material from a generally axially-extending portion of the downstream cover plate adjacent the dovetail, and a third portion of material from a generally radially-extending portion of the downstream cover plate radially inward of the downstream angel wing to obtain the benefits of the profile described above. In at least some embodiments, these benefits are achieved without modifying the dovetail, such that no corresponding modifications to the rotor disk are required to accommodate the modified blade.

Exemplary embodiments of a turbine blade for use in a gas turbine engine and methods for fabricating the same are described above in detail. The methods and apparatus are not limited to the specific embodiments described herein, but rather, components of systems and/or steps of the method may be utilized independently and separately from other components and/or steps described herein. For example, the methods and apparatus may also be used in combination with other rotary machines and methods, and are not limited to practice with only the gas turbine engine assembly as described herein. Rather, the exemplary embodiment can be implemented and utilized in connection with many other rotary machine applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of modifying a shank of a turbine blade from an initial profile to an undercut profile, said method comprising:
   removing a first portion of material from an underside of a downstream angel wing of the turbine blade, wherein the downstream angel wing extends axially from a downstream cover plate of the shank;
   removing a second portion of material from a generally radially outward-facing surface of a generally axially-extending portion of the downstream cover plate, the second portion of material being radially outward from the dovetail of the turbine blade, wherein the removing of the first and second portions of material at least partially defines the undercut profile; and
   putting the turbine blade into service with the undercut profile.

2. The method according to claim 1, wherein removing a first portion of material comprises removing material having a maximum thickness in a range of between 0.070 inches to about 0.150 inches from the underside of the downstream angel wing.

3. The method according to claim 1, wherein removing a second portion of material comprises removing material having a maximum thickness in a range of 0.020 inches to about 0.040 inches from the generally axially-extending portion of the downstream cover plate adjacent the dovetail of the turbine blade.

4. The method according to claim 1, further comprising removing a third portion of material from a generally radially-extending portion of the downstream cover plate radially inward of the downstream angel wing.

5. The method according to claim 4, wherein removing a third portion of material comprises removing material having a maximum thickness in a range of 0.050 inches to about 0.070 inches from the generally radially-extending portion of the downstream cover plate radially inward of the downstream angel wing.

6. The method according to claim 1, wherein removing a first portion of material further comprises removing material to form the undercut profile defined by a plurality of points having coordinates listed in Table 1 subject to a tolerance of about ±0.030 inches, the plurality of points joined with smooth continuous arcs, wherein each of the coordinates for the T datum in Table 1 is adjusted based on a difference between a datum distance W2 of the turbine blade and a reference datum distance W2 associated with Table 1.

7. The method according to claim 1, further comprising defining a shape of the underside of the downstream angel wing and a portion of the downstream cover plate radially inward of the downstream angel wing by a cylindrical rotation of the undercut profile between a pressure side face of the shank and an opposite suction side face of the shank.

8. The method according to claim 1, further comprising defining a shape of the underside of the downstream angel wing and a portion of the downstream cover plate radially inward of the downstream angel wing by a straight translation of the undercut profile between a pressure side face of the shank and an opposite suction side face of the shank.

9. A method of modifying a shank of a turbine blade from an initial profile to an undercut profile, said method comprising:
   removing a first portion of material from an underside of a downstream angel wing of the turbine blade, wherein the downstream angel wing extends axially from a downstream cover plate of the shank; and
   removing a third portion of material from a generally radially-extending portion of the downstream cover plate radially inward of the downstream angel wing, wherein the third portion is contiguous with the first portion.

10. The method according to claim 9, wherein removing a first portion of material comprises removing material having a maximum thickness in a range of 0.070 inches to about 0.150 inches from the underside of the downstream angel wing.

11. The method according to claim 9, wherein removing a third portion of material comprises removing material having a maximum thickness in a range of 0.050 inches to about 0.070 inches from the generally radially-extending portion of the downstream cover plate radially inward of the downstream angel wing.

12. The method according to claim 9, further comprising removing a second portion of material from a generally axially-extending portion of the downstream cover plate adjacent a dovetail of the turbine blade.

13. The method according to claim 12, wherein removing a second portion of material comprises removing material having a maximum thickness in a range of 0.020 inches to about 0.040 inches from the generally axially-extending portion of the downstream cover plate adjacent the dovetail of the turbine blade.

14. The method according to claim 9, wherein removing a first portion of material further comprises removing material to form the undercut profile defined by a plurality of points having coordinates listed in Table 1 subject to a tolerance of about ±0.030 inches, the plurality of points joined with smooth continuous arcs, wherein each of the values for the T datum in Table 1 is adjusted based on a difference between a datum distance W2 of the turbine blade and a reference datum distance W2 associated with Table 1.

15. The method according to claim 9, further comprising defining a shape of the underside of the downstream angel wing and a portion of the downstream cover plate radially inward of the downstream angel wing by a cylindrical rotation of the undercut profile between a pressure side face of the shank and an opposite suction side face of the shank.

16. The method according to claim 9, further comprising defining a shape of the underside of the downstream angel wing and a portion of the downstream cover plate radially inward of the downstream angel wing by a straight translation of the undercut profile between a pressure side face of the shank and an opposite suction side face of the shank.

17. A turbine blade comprising:
an airfoil that extends radially between a root end and a tip end;
a platform coupled to said root end;
a shank that extends radially inwardly from said platform, said shank comprising a downstream cover plate and a downstream angel wing that extends axially from said downstream cover plate; and
a dovetail that extends radially inwardly from said shank, wherein a profile of an underside of said downstream angel wing and a portion of said downstream cover plate radially inward of said downstream angel wing is defined by a plurality of points having coordinates listed in Table 1 subject to a tolerance of about ±0.030 inches, said plurality of points joined with smooth continuous arcs, wherein each of the coordinates for the T datum in Table 1 is adjusted based on a difference between a datum distance W2 of said turbine blade and a reference datum distance W2 associated with Table 1.

18. The turbine blade according to claim 17, wherein said shank further comprises a pressure side face and an opposite suction side face, said downstream cover plate extending therebetween, and wherein a shape of said underside of said downstream angel wing and said portion of said downstream cover plate radially inward of said downstream angel wing is defined by a cylindrical rotation of said profile between said pressure side face and said suction side face.

19. The turbine blade according to claim 17, wherein said shank further comprises a pressure side face and an opposite suction side face, said downstream cover plate extending therebetween, and wherein a shape of said underside of said downstream angel wing and said portion of said downstream cover plate radially inward of said downstream angel wing is defined by a straight translation of said profile between said pressure side face and said suction side face.

20. The turbine blade according to claim 17, wherein said turbine blade has a datum distance W2 substantially equal to the reference datum distance W2 associated with Table 1.

* * * * *